(12) United States Patent
Gilbert

(10) Patent No.: US 8,027,652 B2
(45) Date of Patent: Sep. 27, 2011

(54) RADIO FRONT END

(75) Inventor: Stephen K. Gilbert, Madison, AL (US)

(73) Assignee: Continental Automotive Systems US, Inc., Auburn Hills ( * ) Notice: Subject to any disclaimer, the term of this patent is extended or adjusted under 35 U.S.C. 154(b) by 836 days.

(21) Appl. No.: 11/871,387

(22) Filed: Oct. 12, 2007

(65) Prior Publication Data

US 2008/0090532 A1    Apr. 17, 2008

Related U.S. Application Data

(60) Provisional application No. 60/851,809, filed on Oct. 13, 2006.

(51) Int. Cl.
*H03D 5/00* (2006.01)

(52) U.S. Cl. .......... 455/142; 455/144; 455/188.1; 455/214; 455/266; 455/324; 340/5.53

(58) Field of Classification Search .......... 455/142, 455/144, 188.1, 214, 266, 324; 340/5.53
See application file for complete search history.

(56) References Cited

U.S. PATENT DOCUMENTS

| | | | |
|---|---|---|---|
| 4,737,728 A | 4/1988 | Nakamura et al. | |
| 5,732,337 A | 3/1998 | Wargnier et al. | |
| 7,224,939 B2 * | 5/2007 | Takayama et al. | 455/45 |
| 7,466,959 B2 * | 12/2008 | DeMoor et al. | 455/47 |
| 7,623,890 B2 * | 11/2009 | Nagano et al. | 455/553.1 |
| 2002/0172270 A1 | 11/2002 | Whikehart et al. | |
| 2003/0072320 A1 * | 4/2003 | Seo et al. | 370/441 |
| 2004/0096014 A1 | 5/2004 | Hendrix et al. | |
| 2005/0032480 A1 | 2/2005 | Lee et al. | |
| 2005/0079838 A1 | 4/2005 | Li et al. | |
| 2007/0030116 A1 * | 2/2007 | Feher | 340/5.53 |

FOREIGN PATENT DOCUMENTS

WO    9950954    10/1999

OTHER PUBLICATIONS

International Search Report and Written Opinion dated May 13, 2008.

* cited by examiner

*Primary Examiner* — Sanh D Phu

(57) ABSTRACT

A radio front end utilizes at least one band pass filter to pass only the appropriate frequency band. Once the desired frequency band has been isolated it is converted to a digital format in an analog to digital converter and a digital signal processing device interprets the signal.

12 Claims, 1 Drawing Sheet

RADIO FRONT END

CROSS REFERENCE TO RELATED APPLICATION

This application claims priority to U.S. Provisional Application No. 60/851,809 filed Oct. 13, 2006.

BACKGROUND OF THE INVENTION

The present application relates to a radio front end for filtering incoming radio waves for an automotive AM/FM receiver unit.

A typical analog AM/FM receiver unit for use in automobiles currently consists of several stages. In the first stage an antenna receives a signal and sends it to an amplifier. In the amplifier the signal strength is adjusted to an amplitude that the remaining stages can use. No changes are made to the content of the signal in the initial amplification stage. The initial signal received by the antenna contains all the signals broadcast in the frequency ranges that the antenna is capable of receiving.

After being amplified the signal is sent to a "tracked RF filter." The tracked RF filter is a filtering component that filters the signal based on what frequency the radio is set to receive. If a passenger wishes to listen to 98.5 FM then the tracked RF filter would be adjusted to center its filtering on 98.5 MHz, for example. The tracked RF filter then strips the signal of other frequencies and allows only the selected frequency to pass. After being passed through the filter, the signal is sent to a mixer. In the mixer, the signal is modified until it is a preset frequency. This modification does not significantly change the information that is encoded in the signal; however it does change the frequency from a transmission frequency (for example 98.5 MHz) to a new frequency (for example 10.7 MHz) that the remainder of the components are capable of utilizing.

After the mixer the signal is sent to a second filter. This filter is used to remove static from the signal. Then the signal is sent to a final amplifier where it is again adjusted to ensure it is at a level that the remaining components can handle, and finally it is sent to a demodulator. The demodulator interprets the signal and converts it to an analog audio signal which is sent to the speakers.

Digital receivers currently used in the art utilize an almost identical process as the process described above with the exception of the last step. In a standard digital receiver the demodulator is replaced with an analog to digital converter and a digital signal is sent to a digital device that interprets the signal and outputs an audio signal to the speakers.

Both the analog and the digital designs run into problems with complexity in properly aligning the tracked RF filter. If the tracked RF filter is improperly aligned the resulting signal can have a bleed from other radio stations, static, or any number of other problems associated with the final sound. Additionally the design and implementation of a tracked RF filter is difficult and complex.

Another problem arises as a result of the tracked RF filter in that while it removes some frequencies other than the desired frequency, it also introduces noise at other frequencies into the system. This noise becomes attached to the signal and travels through the remaining components. Once the noise has become attached to the signal it cannot be removed without the introduction of another filter into the system.

Still another problem that arises from the use of the tracked RF filter is that due to technological limitations on the tracked RF filter, only one station may be received at a time for each tuner. Because the tracked RF filter is adjusted to specifically tune into the selected frequency, any other signals are removed before the signal is passed to the next stage. This results in a necessity for multiple tuners if a person desires to record one station while listening to another, or perform any other activity involving multiple radio stations.

SUMMARY OF THE INVENTION

A radio front end uses an antenna, a filter that can pass a radio frequency band while stripping other frequencies, and an analog to digital converter to create a digital radio signal. This signal is interpreted in a digital signal processing unit.

These and other features of the present invention can be best understood from the following specification and drawings, the following of which is a brief description.

DETAILED DESCRIPTION OF THE PREFERRED EMBODIMENT

Figure 1:
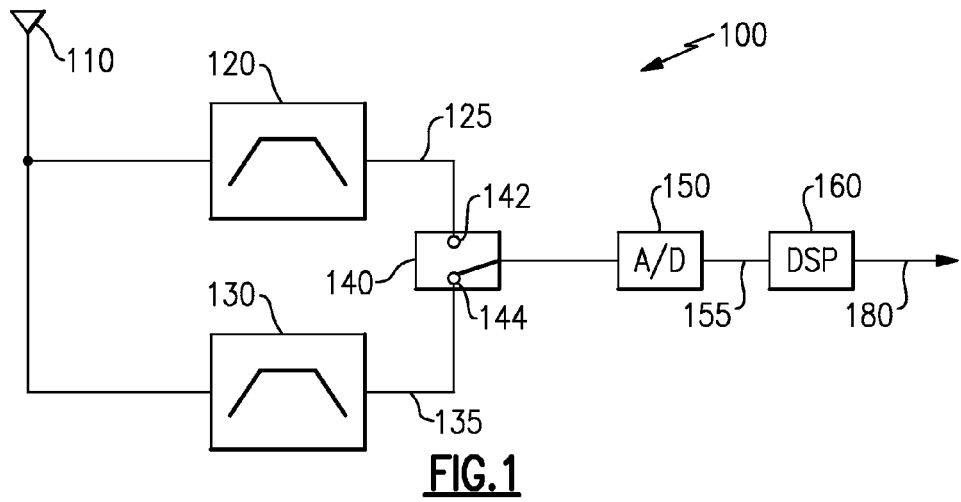
FIG. 1 illustrates a block diagram of an embodiment of a radio front end.

Referring to FIG. 1, an example radio front end 100 receives a signal through an antenna 110. The signal is simultaneously sent to two parallel filters 120, 130. The first filter is an FM frequency band filter 120, and the second filter is an AM frequency band filter 130. The FM frequency band filter 120 will pass a range of frequencies 125 from 87 MHz to 108 MHz, and the AM frequency band filter 130 will pass a range of frequencies 135 from 520 KHz to 1710 KHz. The ranges 125, 135 are examples only, and in practice the AM frequency band and the FM frequency band could encompass any range of frequencies. For the purposes of this application "FM frequency band" and "AM frequency band" should be interpreted to include any two differentiated radio frequency bands. After passing through the FM frequency band filter 120 the signal is passed to an input 142 of a selector 140. Likewise after passing through the AM frequency band filter 130 the signal is passed to an input 144 of the selector 140. The selector 140 is capable of switching between input 142 or 144 and passing the selected input to the next stage in the radio front end 100. After the selector 140 the selected signal is passed to an analog to digital converter 150. The analog to digital converter 150 converts the analog signal it receives into a digital signal 155 which is readable by the digital signal processor (DSP) 160. Once received by the DSP 160 the desired radio frequencies are pulled out and converted into sound signals 180 and sent to speakers so a person can listen to them.

Figure 2:
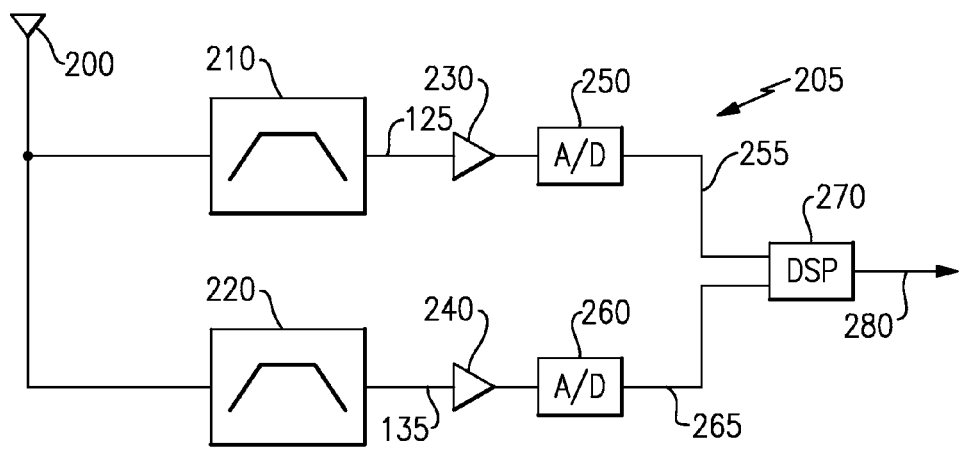
FIG. 2 illustrates a block diagram of a second embodiment of a radio front end.

Referring to FIG. 2, another example radio front end 205 does not include a selector 140 and instead utilizes a first analog to digital converter 250 to convert the signal from a FM frequency band filter 210, and a second analog to digital converter 260 to convert the signal from an AM frequency band filter 220. A first amplifier 230 and a second amplifier 240 increase or decrease the signal strength to put it in a form that the analog to digital converters 250, 260 are capable of converting. The analog to digital converters change the input signals into digital signals 255, 265.

Upon exiting the analog to digital converters 250, 260 the signals 255, 265 are sent to the DSP 270 where the digital signals 255, 265 are processed and a sound signal 280 is ultimately output. Both the FM band signal and the AM band signal are sent to the DSP 270 where the DSP 270 determines which signal to read and utilize. Because both the FM band signal 125 and the AM band signal 135 are sent to the DSP 270 a user may listen to a signal on the FM band and simultaneously record a signal on the AM band, or perform any other use requiring the simultaneous interpretation of both the AM and FM frequency bands.

Figure 3:
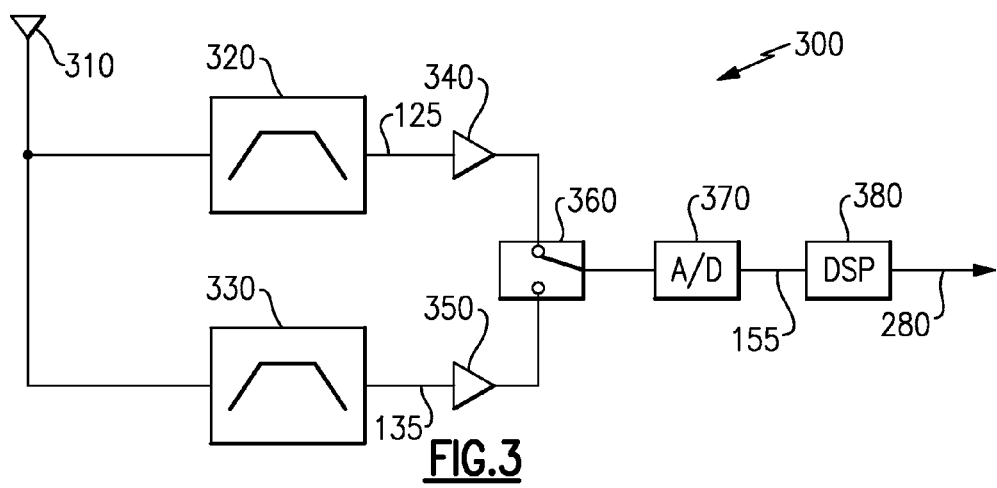
FIG. 3 illustrates a block diagram of a third embodiment of a radio front end.

Referring to FIG. 3, another example radio front end 300 includes two signal amplifiers 340, 350 between the band pass filters 320, and 330 and the selector 360. The amplifiers 340, 350 adjust the strength of the signals 125, 135 to put it at a level desired for processing by the analog to digital converter 370 and the DSP 380.

Although several embodiments of this invention have been disclosed, a worker of ordinary skill in this art would recognize that certain modifications would come within the scope of this invention. For that reason, the following claims should be studied to determine the true scope and content of this invention.

What is claimed is:

1. A radio front end comprising:
   no more than one radio frequency antenna;
   a first filter connected to said antenna for passing a first range of radio frequencies comprising an entire radio frequency band;
   a second filter connected to said antenna for passing a second range of radio frequencies comprising an entire radio frequency band;
   a device for selecting between said first and second filters;
   each of said first range of radio frequencies and said second range of radio frequencies comprising at least a portion of frequencies not encompassed by the other of said first range of frequencies and said second range of frequencies;
   an analog to digital converter for receiving said entire radio frequency band from said at least one filter and outputting an output signal;
   said analog to digital converter being connected between said at least one filter and a digital signal processing unit; and
   said digital signal processing unit for receiving the output signal of said analog to digital converter.

2. The radio front end of claim 1 wherein said first range of frequencies comprises a range of FM radio frequencies.

3. The radio front end of claim 1 wherein said second range of frequencies comprises a range of AM radio frequencies.

4. The radio front end of claim 1, including:
   a first amplifier for scaling the magnitude of an output of said first filter; and
   a second amplifier for scaling the magnitude of an output of said second filter.

5. The radio front end of claim 1, wherein a frequency range passed by said first filter is a fixed range and a frequency range passed by said second filter is a fixed range.

6. A method for preparing a radio signal for digital signal processing comprising:
   receiving an analog signal;
   passing said analog signal through a first and second fixed frequency range filter, wherein said first fixed frequency range filter passes a first range of radio frequencies comprising an entire radio frequency band, said second fixed frequency range filter passes a second range of radio frequencies comprising an entire radio frequency band, and each of said first range of radio frequencies and said second range of radio frequencies comprising at least a portion of frequencies not encompassed by the other of said first range of frequencies and said second range of frequencies;
   selecting between the output of said fixed frequency range filter and said second fixed frequency range filter and passing a selected output to an analog to digital converter;
   converting the analog signal to a digital signal; and
   sending the digital signal to a digital signal processor.

7. The method of claim 6 including the step of altering the magnitude of the analog signal to a desired magnitude.

8. The radio front end of claim 2, wherein said FM radio frequencies comprise a range of frequencies of 87 MHz to 108 MHz.

9. The radio front end of claim 3, wherein said AM radio frequencies comprise a range of frequencies of 520 KHz to 1710 KHz.

10. The radio front end of claim 1, wherein each of said first filter and said second filter are directly connected to said radio frequency antenna.

11. The radio front end of claim 1, wherein said device for selecting between said first and second filters comprises a switch connecting each of said first filter and said second filter to said analog to digital converter, such that said switch controls a connection between each of said first filter and said second filter and said analog to digital converter.

12. The method of claim 6, wherein said step of passing said analog signal through a second fixed frequency range filter occurs simultaneous to said step of passing said analog signal through a first fixed frequency range filter.

* * * * *